United States Patent
Yoo et al.

(10) Patent No.: US 12,248,711 B2
(45) Date of Patent: Mar. 11, 2025

(54) STORAGE DEVICE PERFORMING SELF-DIAGNOSIS AND STORAGE SYSTEM INCLUDING THE SAME

(71) Applicant: Samsung Electronics Co., Ltd., Suwon-si (KR)

(72) Inventors: Hyunjoon Yoo, Suwon-si (KR); Dongouk Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 17/987,447

(22) Filed: Nov. 15, 2022

(65) Prior Publication Data

US 2023/0153038 A1   May 18, 2023

(30) Foreign Application Priority Data

Nov. 15, 2021 (KR) .......... 10-2021-0157087
May 23, 2022 (KR) .......... 10-2022-0063067

(51) Int. Cl.
*G06F 3/00* (2006.01)
*G06F 3/06* (2006.01)

(52) U.S. Cl.
CPC .......... *G06F 3/0689* (2013.01); *G06F 3/0619* (2013.01); *G06F 3/0629* (2013.01); *G06F 3/064* (2013.01)

(58) Field of Classification Search
None
See application file for complete search history.

(56) References Cited

U.S. PATENT DOCUMENTS

| | | | |
|---|---|---|---|
| 9,529,674 B2 | 12/2016 | Pereira et al. | |
| 9,812,224 B2* | 11/2017 | Yun .................. | G11C 29/52 |
| 10,803,970 B2 | 10/2020 | Schuh et al. | |
| 10,831,603 B2 | 11/2020 | Kulkarni et al. | |
| 10,983,885 B2 | 4/2021 | Cagno et al. | |
| 2010/0017650 A1 | 1/2010 | Chin et al. | |
| 2013/0007545 A1 | 1/2013 | Galbraith et al. | |
| 2013/0268724 A1* | 10/2013 | Seo ............... | G06F 11/108 711/103 |
| 2016/0371161 A1* | 12/2016 | Louie .............. | G06F 11/1662 |
| 2019/0385694 A1 | 12/2019 | Chen et al. | |
| 2021/0247924 A1 | 8/2021 | Seo et al. | |

FOREIGN PATENT DOCUMENTS

| | | | |
|---|---|---|---|
| KR | 10-2177421 B1 | 11/2020 | |
| KR | 10-2304929 B1 | 9/2021 | |

\* cited by examiner

*Primary Examiner* — Midys Rojas
(74) *Attorney, Agent, or Firm* — Muir Patent Law, PLLC

(57) ABSTRACT

A storage device configured to be connected to a redundant array of inexpensive disk (RAID) controller includes a plurality of non-volatile memories. A memory controller is configured to control the plurality of non-volatile memories to store data distributed by the RAID controller based on a RAID configuration signal received from the RAID controller. The memory controller is configured to perform self-diagnosis on the plurality of non-volatile memories to determine whether at least one of the plurality of non-volatile memories has an uncorrectable error when a RAID configuration signal is deactivated.

20 Claims, 13 Drawing Sheets

STORAGE DEVICE PERFORMING SELF-DIAGNOSIS AND STORAGE SYSTEM INCLUDING THE SAME

CROSS-REFERENCE TO RELATED APPLICATIONS

This application is based on and claims priority under 35 U.S.C. § 119 to Korean Patent Application Nos. 10-2021-0157087, filed on Nov. 15, 2021 and 10-2022-0063067, filed on May 23, 2022, in the Korean Intellectual Property Office, the disclosures of which are incorporated by reference herein in their entireties.

BACKGROUND

The inventive concept relates to a storage device and a storage system including the same, and more particularly, to a storage device for performing self-diagnosis, and a storage system including the same.

Redundant array of inexpensive disk (RAID) is technology that distributes data into a plurality of memory devices. When using RAID, it is possible to correct errors generated in other memory devices. Recently, with the development of technology, solid state drives (SSDs) are widely used instead of hard disk devices. Memory devices have a limited life as programming/erasing cycles are repeated. When the life of the memory devices is over, the data stored in the memory devices may not be used, so research to increase the life of memory devices is ongoing.

SUMMARY

The inventive concept provides a storage device for preventing data loss and extending the life of a memory device connected by a redundant array of inexpensive disk (RAID) by performing self-diagnosis on the memory device, and a storage system including the same.

According to an aspect of the inventive concept, there is provided a storage device configured to be connected to a redundant array of inexpensive disk (RAID) controller. The storage device includes a plurality of non-volatile memories, and a memory controller configured to control the plurality of non-volatile memories to store data distributed by the RAID controller, based on a RAID configuration signal received from the RAID controller, wherein the memory controller is further configured to perform self-diagnosis on the plurality of non-volatile memories to determine whether at least one of the plurality of non-volatile memories has an uncorrectable error when the RAID configuration signal is deactivated.

According to another aspect of the inventive concept, there is provided a storage device including at least one non-volatile memory including a plurality of memory blocks, and a memory controller including an internal RAID control circuit, the RAID control circuit being configured to generate an internal redundant array of inexpensive disk (RAID) configuration signal, wherein the memory controller is further configured to control the plurality of memory blocks to allow data to be distributed and stored in the plurality of memory blocks by controlling an internal RAID operation for the plurality of memory blocks, based on the internal RAID configuration signal, and deactivate the internal RAID configuration signal to determine whether at least one of the plurality of memory blocks has an uncorrectable error, and perform self-diagnosis on the plurality of memory blocks.

According to another aspect of the inventive concept, there is provided a storage system including at least one storage device, and a data bus connected to the at least one storage device, wherein the at least one storage device includes a memory controller including a peer to peer redundant array of inexpensive disk (P2P RAID) control circuit, the P2P control circuit being configured to generate a P2P RAID configuration signal, and a plurality of non-volatile memories, and wherein the memory controller is further configured to control the plurality of non-volatile memories such that provided data is distributed and stored in the plurality of non-volatile memories by controlling a P2P RAID operation for the plurality of non-volatile memories in accordance with the P2P RAID configuration signal, and deactivate the P2P RAID configuration signal to determine whether at least one of the plurality of non-volatile memories has an uncorrectable error, and perform self-diagnosis on the plurality of non-volatile memories.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
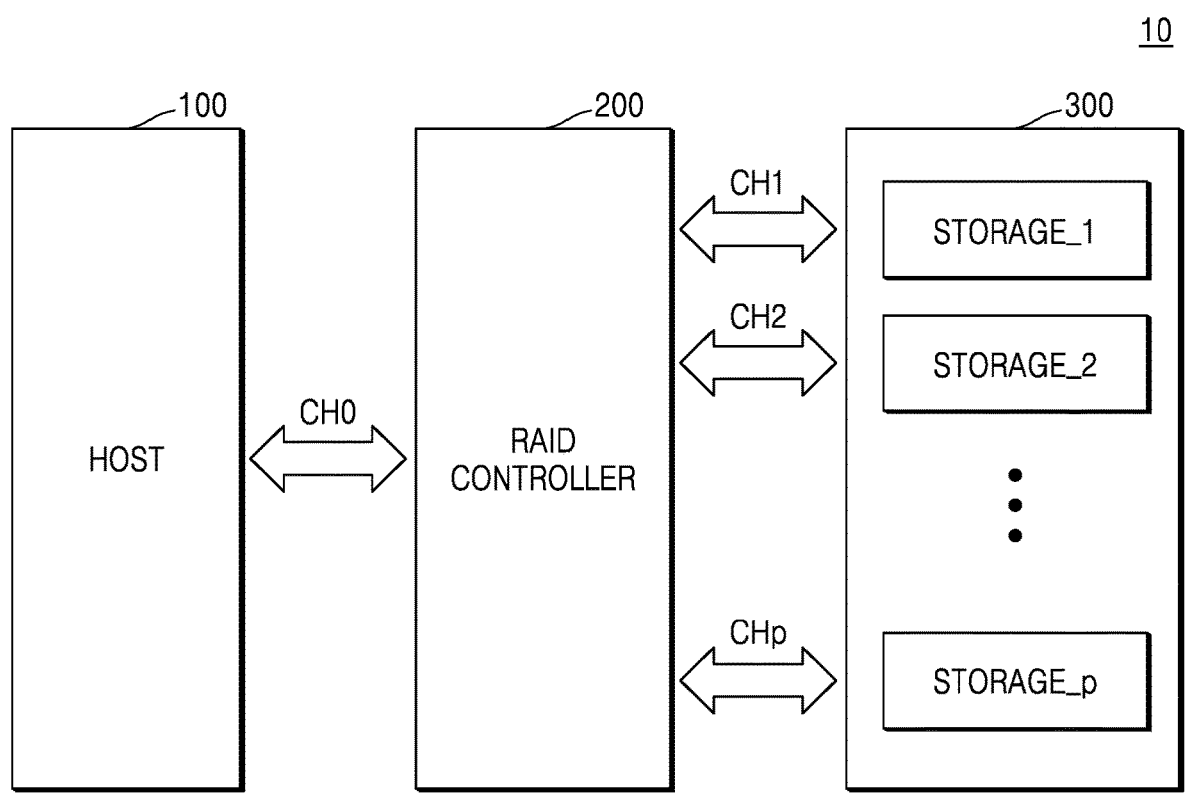
FIG. 1 is a block diagram of a data storage environment according to an embodiment.

FIG. 1 is a block diagram of a data storage environment according to an embodiment. The data storage environment 10 may comprise a computer (e.g., general purpose computer, a server, a cloud based storage system having a data server and storage, etc.) including a host 100, a redundant array of inexpensive disk (RAID) controller 200, and a storage device set 300. The storage device set 300 may include first to p-th (p is a natural number equal to 2 or more) storage devices.

In some embodiments, the RAID controller 200 and the storage device set 300 may be separated from each other (e.g., with one or more busses forming channels CH1 to CHp) and may be configured as independent devices. For example, the RAID controller 200 may be a semiconductor chip and the storage device set 300 may be one or more semiconductor chips or one or more semiconductor packages.

The RAID controller 200 may be coupled to the host 100 and the storage device set 300. The RAID controller 200 may be configured to access the storage device set 300, in response to a request from the host 100. The RAID controller 200 may communicate with the host 100 through a channel CH0 between the host 100 and the RAID controller 200.

The RAID controller 200 may communicate with the storage device set 300 through channels CH1 to CHp between the storage device set 300 and the RAID controller 200. It is illustrated in drawings that there are p channels between the storage device set 300 and the RAID controller 200, which respectively correspond to first to p-th storage devices, but the inventive concept is not limited thereto.

The RAID controller 200 may constitute an interface between the storage device set 300 and the host 100. In addition, the RAID controller 200 may be configured to drive firmware for controlling the storage device set 300.

For example, the RAID controller 200 may further include well-known components, such as random access memory (RAM), a processing unit (e.g., a central processing unit (CPU), a graphics processing unit (GPU), a digital signal processor (DSP), etc.), a host interface, and a memory interface. Here, the RAM may be used as at least one of an operation memory of the processing unit, a cache memory between the storage device set 300 and the host 100, and a buffer memory between the storage device set 300 and the host 100, and the processing unit may control the overall operation of the RAID controller 200.

The RAID controller 200 may perform a RAID recovery (Recovery) for the storage device set 300. Specifically, the RAID controller 200 may perform the RAID recovery in stripe units for the storage device set 300. More specifically, the RAID controller 200 may perform an external RAID recovery in stripe units for the storage device set 300.

In addition, the RAID configurations described below may be implemented by various levels of RAID. Some examples of these RAID levels include RAID level 0 (striped set without parity or striping), RAID level 1 (mirrored set without parity or mirroring), RAID level 2 (hamming code parity), RAID level 3 (striped set with dedicated parity, bit interleaved parity, or byte level parity), RAID level 4 (block level parity), RAID level 5 (striped set with distributed parity or interleave parity), RAID level 6 (striped set with dual distributed parity), RAID level 7, RAID level 10, and a merged RAID level, which is a combination of at least two of the above RAID levels (e.g., RAID 0+1, RAID 1+0, RAID 5+0, RAID 5+1, RAID 0+1+5, etc.).

In the data storage environment (computer 10) according to some embodiments, external RAID recovery technology and error correction code (ECC) technology may be adopted. However, the inventive concept is not limited thereto, and in some embodiments, internal RAID recovery technology and ECC technology may be adopted as shown in and described with respect to FIG. 12. External RAID technology may store RAID parity data in one of a plurality of independent semiconductor chips that is separate from other semiconductor chips that store the data corresponding to the RAID parity data, and the internal RAID technology may mean technology for recovering data by storing RAID parity data and the data corresponding to the RAID parity data in one semiconductor chip.

In some embodiments, the RAID controller 200 and the storage device set 300 may be integrated as one semiconductor device, such as a semiconductor chip or a semiconductor package comprising several semiconductor chips. For example, the RAID controller 200 and the storage device set 300 may be integrated as one semiconductor device and may form a memory card, such as a personal computer memory card, a compact flash (CF) card, a smart media card (SMC), a memory stick, a multimedia card (MMC), a Secure Digital (SD) card, or a universal flash storage (USF).

The RAID controller 200 and the storage device set 300 may be integrated as one semiconductor device and form a solid state drive (SSD). In some embodiments, the storage device set 300 may include NAND memory. When the RAID controller 200 and the storage device set 300 are integrated as one semiconductor device and used as an SSD, the operation speed of the host 100 connected to the RAID controller 200 may be dramatically improved. However, the inventive concept is not limited thereto, and the RAID controller 200 and the storage device set 300 may be physically separated so that they may be detachable from one another.

Figure 2:
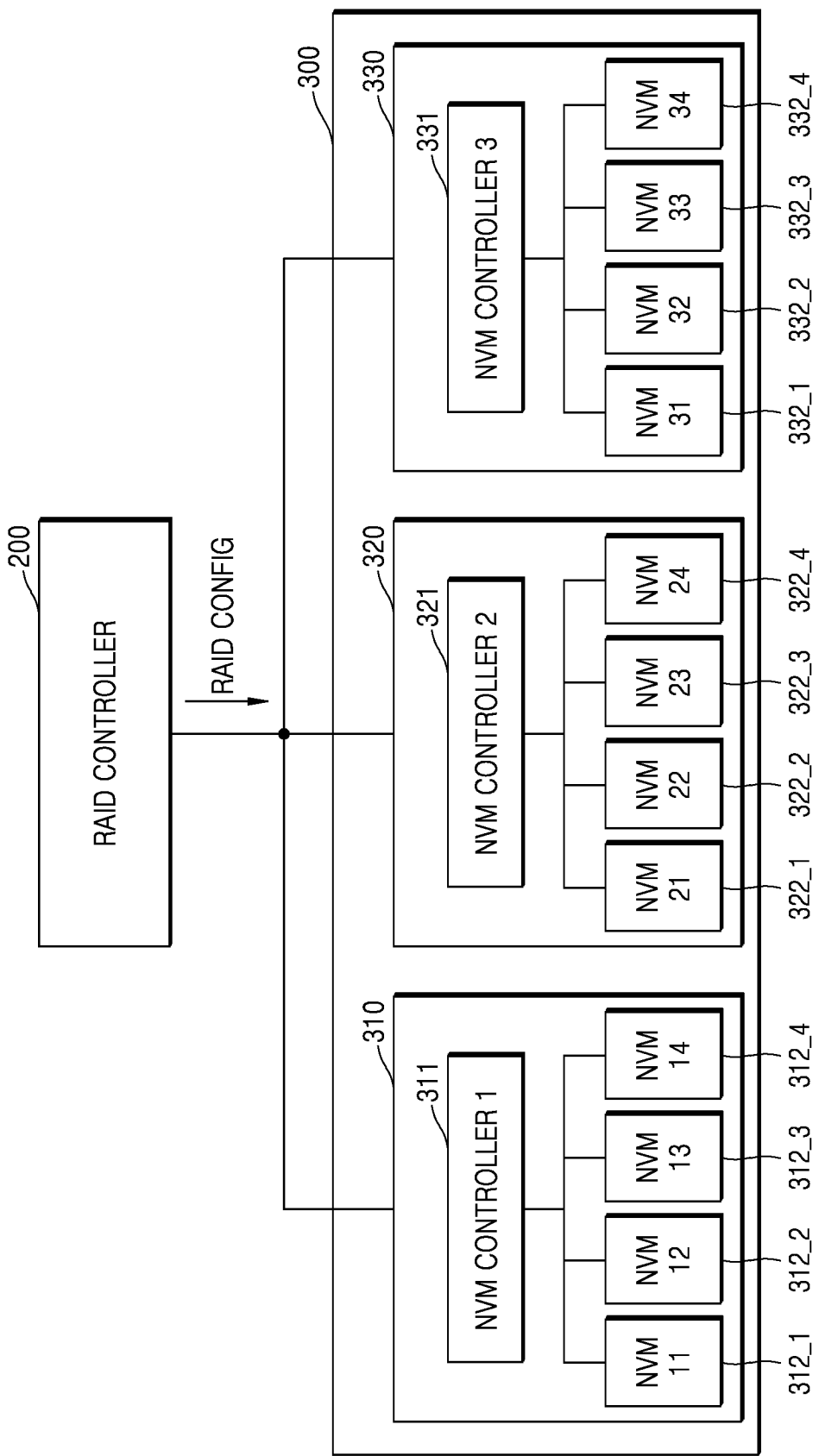
FIG. 2 is a block diagram of a storage system according to an embodiment.

FIG. 2 is a block diagram of a storage system 20 according to an embodiment including a RAID controller 200 and a storage device set 300.

The storage system 20 is one example of the RAID controller 200 and the storage device set 300 of FIG. 1.

The storage device set 300 may include first to third storage devices 310, 320, and 330. The first to third storage devices 310, 320, and 330 may include first to fourth non-volatile memories 312_1 to 312_4, 322_1 to 322_4, and 332_1 to 332_4 and memory controllers 311, 321, and 331, respectively. It should be noted that use of the subscript "i" may be used to generically refer to each or an individual one of a group of similar or identical elements. For example, 312_i may be used herein to refer to each or generically to an individual one of the first to fourth non-volatile memories 312_1 to 312_4. It is illustrated in FIG. 2 that the storage device set 300 includes three, that is, the first to third storage devices 310 to 330, and the first to third storage devices 310 to 330 include first to fourth non-volatile memories 312_1 to 312_4, 322_1 to 322_4, and 332_1 to 332_4, respectively, but the inventive concept is not limited thereto. Hereinafter, the first to fourth non-volatile memories 312_1 to 312_4 and the memory controller 311 of storage device 310 are explained as an example, but it will be appreciated that such explanation is applicable to the corresponding aspects of the other storage devices.

Each of the first to fourth non-volatile memories 312_1 to 312_4 may include first to m-th pages. (Here, m is a natural number greater than 1.) The first to fourth non-volatile memories 312_1 to 312_4 may be read and written to in units of pages. For example, a block of memory of a non-volatile memory 312_i may include a plurality of pages, each page corresponding to a wordline that may select a row (a page) of memory cells upon selection (e.g., activation) of the wordline so that data may be written or read to the page.

Furthermore, the first to fourth non-volatile memories 312_1 to 312_4 may include first to n-th memory blocks (where n is a natural number greater than 1). In some examples, a memory block may be a contiguous section of the non-volatile memory where memory cells within this section are erased together in an erase operation. In some examples, a memory block may correspond to the smallest unit of the non-volatile memory that may be individually erased (without erasing other portions of the non-volatile memory). For example, such memory blocks may each comprise a contiguous area of the non-volatile memory 312_i in which a plurality of pages are arranged and addressed (identified) by the same block address and, in some examples, may also be erased together in performing an erase operation in response to the same erase command (externally received from memory controller 311, e.g.). The first to m-th pages may be arranged in the first to n-th memory blocks, respectively. The first to n-th memory blocks may be sequentially or randomly arranged in the first to fourth non-volatile memories 312_1 to 312_4.

The memory controller 311 may control the first to fourth non-volatile memories 312_1 to 312_4. The memory controller 311 may program data in the first to m-th pages included in the first to fourth non-volatile memories 312_1 to 312_4. The memory controller 311 may receive data from the RAID controller 200. The data may be transmitted to perform a write operation to the first to fourth non-volatile memories 312_1 to 312_4. The data may include an error correction code (ECC). Each ECC may comprise a code (e.g., parity bits) for determining whether there is an error in the data, such as whether the data includes one or more error bits and whether these error bits can be identified in the data and corrected or whether the number of error bits is too large to be able to correct. Each ECC may be generated and associated with a certain data unit (non-parity bits), the combination of which forming data may be referenced as a codeword. Accordingly, the data may include parity bits and non-parity bits.

The RAID controller 200 may control the memory controller 311. The storage system 20 of the inventive concept may include the first to third storage devices 310 to 330. Accordingly, the RAID controller 200 may control first to third memory controllers 311 to 331. For example, the RAID controller 200 may generate a RAID configuration signal RAID CONFIG used for determining whether to operate the storage device set 300 with a RAID configuration, and may transmit data and the RAID configuration signal to the memory controller 311. The RAID operation may include an operation in which the RAID controller 200 generates RAID parity based upon a plurality of pieces of data, then distributes the plurality of pieces of data and the RAID parity across a plurality of non-volatile memories, and the memory controller 311 programs the plurality of pieces of distributed data and the RAID parity in a plurality of non-volatile memories.

The RAID controller 200 may generate RAID parity using first to (m−1)-th data. The RAID parity may be used in determining whether an error has occurred in data during the RAID process of connecting a plurality of storage locations in parallel and using the storage locations.

One or a plurality of RAID parities may be used, depending on the RAID scheme. In addition, one RAID parity may be copied and stored several times.

For example, the RAID controller 200 may generate a RAID parity using first to third data. However, the inventive concept is not limited thereto, and the RAID controller 200 may configure the RAID using more non-volatile memories.

The memory controller 311 may program first to third data in first to third pages included in any one of first to fourth non-volatile memories 312_1 to 312_4, and may program the RAID parity in the fourth page included in any one of the first to fourth non-volatile memories 312_1 to The RAID configuration signal RAID CONFIG may indicate whether to turn on or off the RAID operation. When the RAID configuration signal RAID CONFIG is activated, the memory controller 311 may program first to (m−1)-th data in first to (m−1)-th pages in a manner that has been distributed by the RAID controller 200, and program the RAID parity in the m-th page. Namely, the RAID configuration signal RAID CONFIG may activate the RAID operation of the first to third storage devices 310 to 330. At this time, the RAID of the first to third storage devices 310 to 330 may operate at various RAID levels. The RAID operation method of the first to third storage devices 310 to 330 may include RAID level 0, RAID level 1, RAID level 5, RAID level 6, RAID level 10, and a combined RAID level. However, the inventive concept is not limited thereto.

However, when the RAID configuration signal RAID CONFIG is deactivated, the memory controller 311 may respectively program first to m-th data, which is received from the RAID controller 200, in first to m-th pages. For example, only data received by the RAID controller 200 may be stored in first to fourth non-volatile memories 312_1 to 312_4 of the first storage device 310 without using a RAID parity. Namely, the memory controller 311 may control the first to fourth non-volatile memories 312_1 to 312_4 to allow only data dispersed by the RAID controller 200 to be stored in the first to fourth non-volatile memories 312_1 to 312_4.

As described below with reference to drawings, when the RAID configuration signal RAID CONFIG is deactivated, the memory controller 311 may perform self-diagnosis on first to fourth non-volatile memories 312_1 to 312_4 to determine whether at least one of the first to fourth non-volatile memories 312_1 to 312_4 has an uncorrectable error. Accordingly, the data loss of the first storage device 310 may be prevented and the lifespan of the first storage device 310 may be increased. In addition, it may be determined whether the first storage device 310 is usable early as the first storage device 310 itself determines whether the first storage device 310 is continuously usable before intervention by the host 100.

Figure 3:
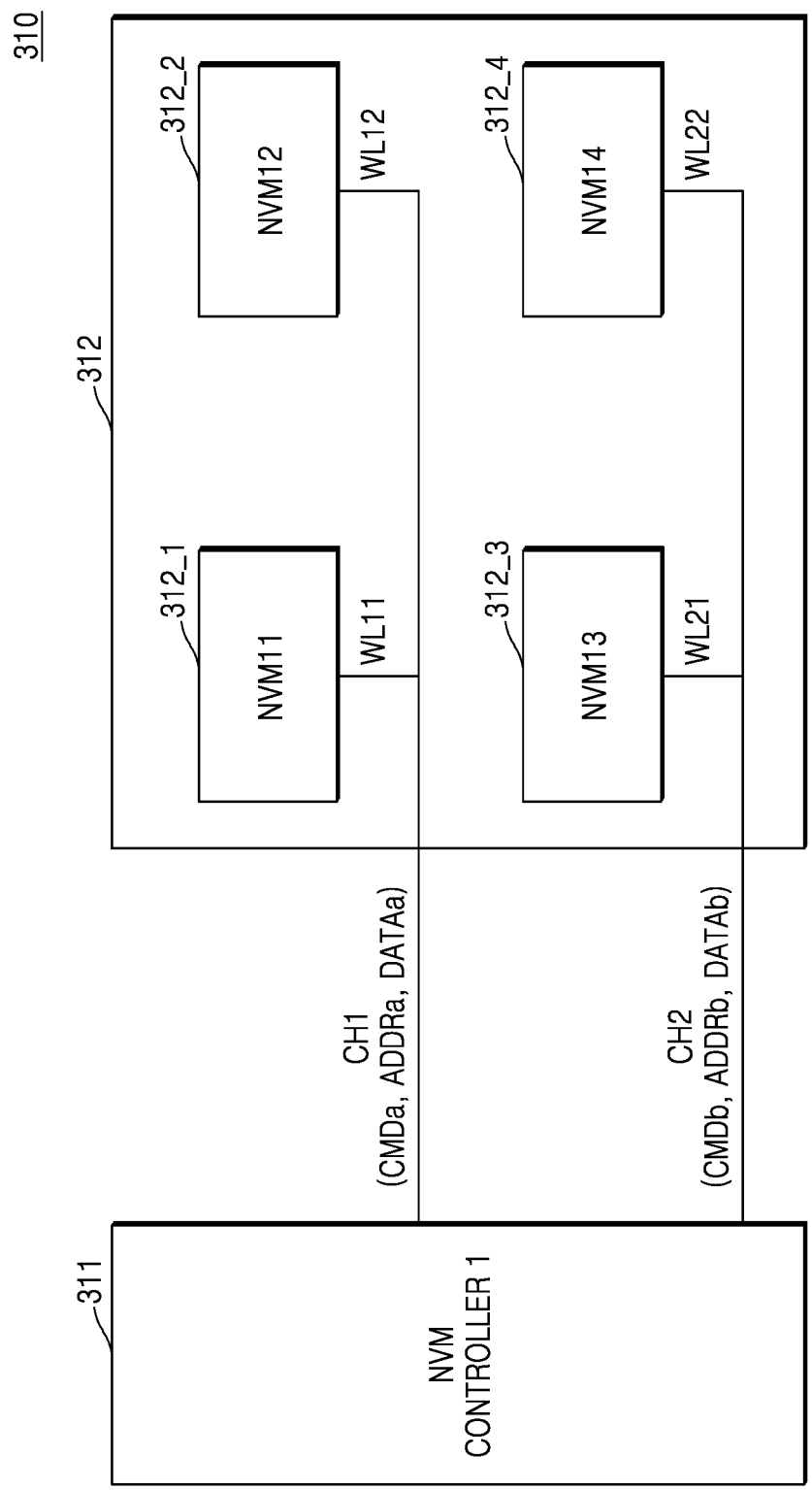
FIG. 3 is a block diagram of a storage device according to an embodiment.

FIG. 3 is a block diagram of a storage device according to an embodiment. Referring to FIG. 3, the first storage device 310 may include a memory controller 311 and a non-volatile memory set 312.

It is illustrated in FIG. 3 that the non-volatile memory set 312 communicates with the memory controller 311 through 2 channels (CH1 and CH2), and the non-volatile memory set 312 includes 2 non-volatile memories for each channel (312_1 to 312_2 for CH1 and 312_3 to 312_4 for CH2), but the number of channels and the number of non-volatile memories connected to one channel may be changed variously. Each of the non-volatile memories may comprises one or more semiconductor memory chips, such as NAND flash memory chip(s). When the non-volatile memories comprise a plurality of memory chips, each non-volatile memory may be in the form of a semiconductor package (e.g., a plurality of NAND or other memory chips encased in a corresponding protective encapsulant).

The first storage device 310 may support channels CH1 and CH2, and the non-volatile memory set 312 and the memory controller 311 may be connected to each other through the channels CH1 and CH2. For example, the first storage device 310 may be implemented as a storage device, such as an SSD.

The non-volatile memory set 312 may include first to fourth non-volatile memories 312_1 to 312_4. Each of the first to fourth non-volatile memories 312_1 to 312_4 may have a plurality of word lines that may be selected (based on addressing) to be operatively connected to a corresponding one of the channels CH1 and CH2. In an embodiment, each of the first to fourth non-volatile memories 312_1 to 312_4 may be implemented in an arbitrary memory unit, which may be operated according to individual commands from the memory controller 311. For example, each of the first to fourth non-volatile memories 312_1 to 312_4 may be implemented as a semiconductor chip (also referred to as a die), but the inventive concept is not limited thereto and these memories may each be implemented as a plurality of semiconductor chips as described elsewhere herein.

The memory controller 311 may transmit and receive signals to and from the non-volatile memory set 312. For example, the memory controller 311 may transmit commands CMDa and CMDb, addresses ADDRa and ADDRb, and data DATAa and DATAb to the non-volatile memory set 312 through channels CH1 and CH2 and receive data DATAa and DATAb from the non-volatile memory set 312.

The memory controller 311 may select one or more of the first to fourth non-volatile memories 312_1 to 312_4 connected to each of the channels CH1 and CH2 and transmit and receive signals to and from the selected non-volatile memory through the channel. For example, the memory controller 311 may select the first non-volatile memory 312_1 among first and second non-volatile memories 312_1 and 312_2 connected to the first channel CH1. The memory controller 311 may transmit a command CMDa, an address ADDRa, and data DATAa to the first non-volatile memory 312_1 through the first channel CH1 or receive data DATAa from the selected first non-volatile memory 312_1.

The memory controller 311 may transmit and receive signals to and from the non-volatile memory set 312 in parallel through different channels. For example, the memory controller 311 may select and access the first non-volatile memory 312_1 among first and second non-volatile memories 312_1 and 312_2 connected to the first channel CH1 and concurrently, select and access the third non-volatile memory 312_3 among the third and fourth non-volatile memories 312_3 and 312_4 connected to the first channel CH1. For example, the memory controller 311 may transmit a command CMDb to the non-volatile memory set 312 (e.g., to the selected non-volatile memory (e.g., 312_3)) through the second channel CH2 while transmitting a command CMDa to the non-volatile memory set 312 (e.g., to the selected non-volatile memory (e.g., 312_1)) through the first channel CH1. For example, the memory controller 311 may receive data DATAb from the non-volatile memory set 312 through the second channel CH2 while receiving data DATAa from the non-volatile memory set 312 through the first channel CH1. Other combinations of access operations by the memory controller 311 to the non-volatile memories 312_1 to 312_4 may also be performed in parallel.

The memory controller 311 may control the overall operation of the non-volatile memory set 312. The memory controller 311 may control each of the first to fourth non-volatile memories 312_1 to 312_4 such that two of which that are connected to channels CH1 and CH2 by transmitting signals via the channels CH1 and CH2. For example, the memory controller 311 may control one selected among the first and second non-volatile memories 312_1 and 312_2 by transmitting a command CMDa and an address ADDRa via the first channel CH1.

Each of the first to fourth non-volatile memories 312_1 to 312_4 may operate according to the control of the memory controller 311. For example, the first non-volatile memory 312_1 may program data DATAa according to the command CMDa and the address ADDRa provided to the first channel CH1. For examples, the third non-volatile memory 312_3 may read data DATAb according to the command CMDb and the address ADDRb provided to the second channel CH2 and transmit the read data DATAb to the memory controller 311.

Figure 4:
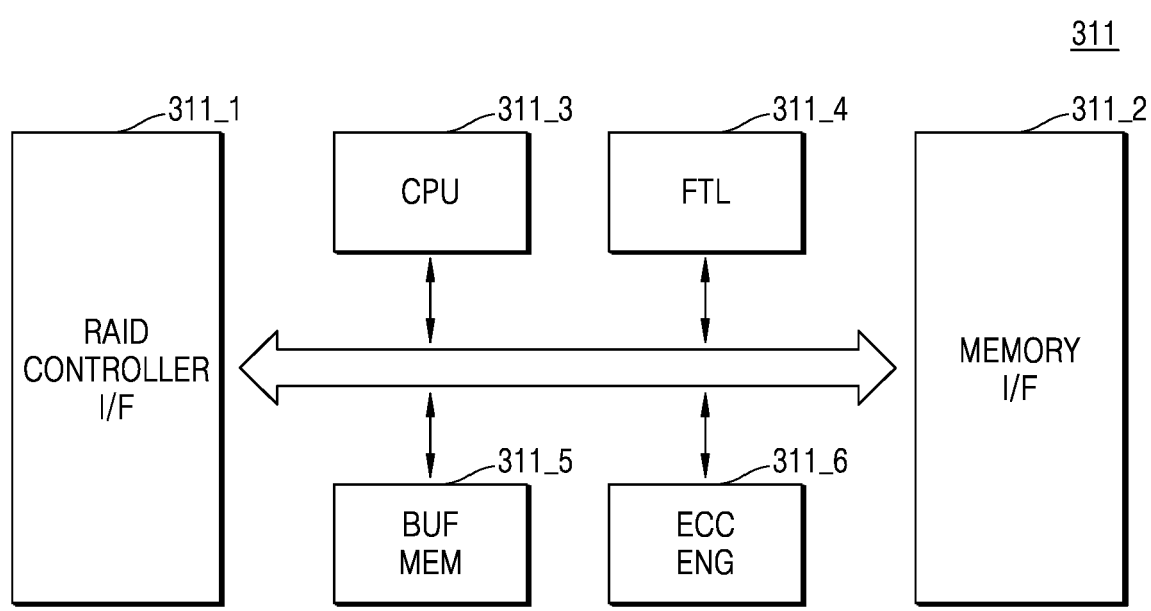
FIG. 4 is a block diagram of a memory controller according to an embodiment.

FIG. 4 is a block diagram of a memory controller according to an embodiment.

The memory controller 311 may include a RAID controller interface 311_1, a memory interface 311_2, and a central processing unit (CPU) 311_3. Furthermore, the memory controller 311 may further include a flash translation layer (FTL) 311_4, a buffer memory 311_5, and an ECC engine 311_6. The memory controller 311 may further include a working memory into which the FTL 311_4 is loaded, and data storing and reading performed on the non-volatile memory set 312 may be controlled by execution of the FTL 311_4 by the CPU 311_3.

Referring to FIGS. 2 to 4, the RAID controller interface 311_1 may transmit and receive packets to and from the RAID controller 200. Packets, which are transmitted from the RAID controller 200 to the RAID controller interface 311_1, may include a command and data to be stored in the non-volatile memory set 312, and packets, which are transmitted from the RAID controller interface 311_1 to the RAID controller 200, may include a response to a command and data which has been read from the non-volatile memory set 312. The memory interface 311_2 may transmit data, which is to be stored in the non-volatile memory set 312, to the non-volatile memory set 312, or receive data, which has been read from the non-volatile memory set 312. The memory interface 311_2 may be implemented to comply with standard protocols, such as Toggle and open NAND flash interface (ONFI).

The FTL 311_4 may perform various operations, such as address mapping, wear-leveling, and garbage collection. The address mapping operation is an operation of changing a logical address received from the RAID controller 200 into a physical address of memory (e.g., identifying memory at a fixed physical location) which may store data in the non-volatile memory set 312. Wear-leveling prevents excessive deterioration of a particular block by using blocks uniformly in the non-volatile memory set 312, such as by tracking and balancing the erase counts of blocks of memory. Garbage collection tracks data that is valid and data that is invalid, and organizes available memory capacity in the non-volatile memory set 312 by copying valid data of a first block to a new block and erasing the first block.

The ECC engine 311_6 may perform error detection and correction on read data, which is obtained from the non-volatile memory set 312. More specifically, the ECC engine 311_6 may generate parity bits for write data to be written in the non-volatile memory set 312, and the generated parity bits together with write data (e.g., a codeword) may be stored in the non-volatile memory set 312. When reading data (e.g., a codeword) from the non-volatile memory set 312, the ECC engine 311_6 may correct errors of the read data using parity bits, which are read from the non-volatile memory set 312, together with the read data, and output error-corrected read data.

FIGS. 5 to 11 are flowcharts illustrating an operation of verifying whether a storage device may be continued to be used. FIGS. 5 to 11 is described with reference to FIGS. 1 to 4 and their corresponding description herein. Operation S100 of verifying whether the storage device may be continued to be used of FIGS. 5 to 11 is described with reference to the first storage device 310, the memory controller 311, and the first to fourth non-volatile memories 312_1 to 312_4 shown in FIG. 2. Herein, this is merely an example, and the operations of the other storage devices 320 and 330, the other memory controllers 321 and 331 and the first to fourth non-volatile memories 322_1 to 322_4 and 332_1 to 332_4 may be explained with reference to the description on FIG. 5.

Figure 5:
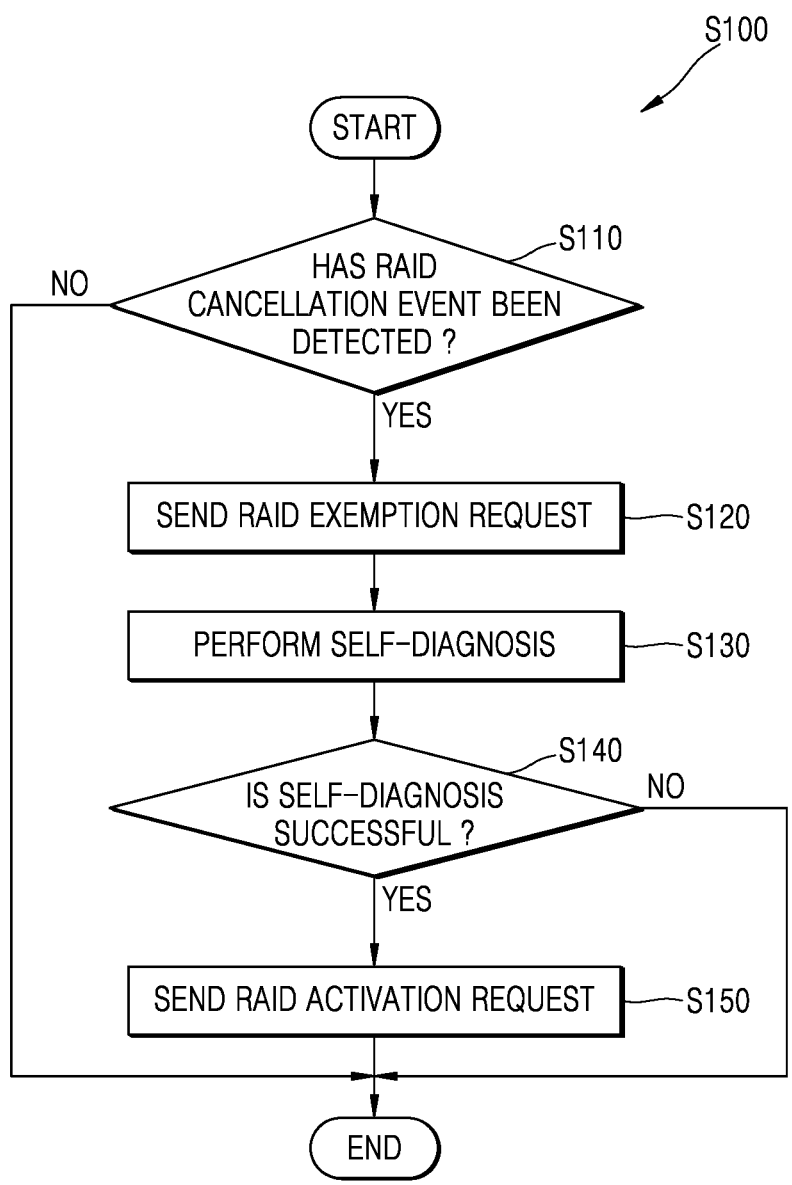
FIG. 5 is a flowchart illustrating an operation of verifying whether a storage device may be continued to be used, according to an embodiment.

FIG. 5 is a flowchart illustrating an operation of verifying whether a storage device may be continued to be used, according to an embodiment.

Operation S100 of verifying whether the storage device (e.g., storage device 310) or a portion thereof (e.g., a non-volatile memory 312_i, or all non-volatile memories 312_i of a particular channel (e.g., CH1 or CH2)) may be continued to be used may include operations S110 to S150. The following descriptions refer to verification of a storage device, but will be understood to equally apply to portions thereof, such as noted herein.

In operation S110, the memory controller 311 of the first storage device 310 may detect a RAID cancellation request event (e.g., determine that an event has occurred that warrants requesting RAID cancellation). In the inventive concept, the RAID cancellation request event may mean a case where it is determined that data storage of the storage device is unreliable—where there are doubts about whether a storage device may be continued to be used due to generation of uncorrectable errors or defects in a non-volatile memory of the storage device, such as described below with reference to FIGS. 6 to 8. Namely, the description that the memory controller 311 has detected a RAID cancellation request event may mean that a situation, which arouses doubt about the further usability of the non-volatile memory 312_i corresponding to the memory controller 311, has occurred. When the memory controller 311 detects a RAID cancellation request event, operation S120 may be performed. When the memory controller 311 fails to detect a RAID cancellation request event, operation S100 of verifying whether the storage device may be continued to be used may be terminated.

In some embodiments, when the memory controller 311 detects the RAID cancellation request event, the memory controller 311 may generate a data control transfer request signal and provide the data control transfer request signal to the RAID controller 200. The RAID controller 200 may transfer data in a non-volatile memory, where a RAID cancellation request event has occurred, based on the data control transfer request signal. For example, the RAID controller 200 may transfer data in the non-volatile memory, in which a RAID cancellation request event has occurred, to other non-volatile memory of storage devices connected by RAID, or another preliminary storage device. If a self-diagnosis result of operation S140 is a success, the transferred data may be transferred back to the non-volatile memory, in which the RAID cancellation request event has occurred.

In operation S120, the memory controller 311 may send a RAID exemption request of the first storage device 310 to the RAID controller 200. Specifically, the memory controller 311 may send a RAID exemption request of the first storage device 310 by generating a first RAID deactivation request signal and providing the first RAID deactivation request signal to the RAID controller 200. The RAID controller 200 may deactivate the RAID configuration signal RAID CONFIG in response to receiving the first RAID deactivation request signal. When the RAID configuration signal RAID CONFIG is deactivated, the first storage device 310 may stop operating in accordance with the RAID operation. In the case that the memory controller 311 has sent a RAID exemption request of the first storage device 310 to the RAID controller 200, the memory controller 311 may send a firmware update request including a defense code update to the host 100 through the RAID controller 200. The host 100 may deliver updated firmware to the memory controller 311 through the RAID controller 200, in response to the request of the memory controller 311. The updated firmware may be used in changing a recovery logic, such as disclosed herein with respect to FIG. 9.

In operation S130, the memory controller 311 may perform self-diagnosis on a plurality of non-volatile memories 312_1 to 312_4. In the inventive concept, the self-diagnosis may mean an operation of diagnosing the state of the plurality of non-volatile memories 312_1 to 312_4 by the memory controller 311 itself, which may be before any verification request of the host 100 or the RAID controller 200. The self-diagnosis operation is described in detail with reference to FIG. 9.

In operation S140, the self-diagnosis result may be determined. If the self-diagnosis result is a success, operation S150 may be performed. If the self-diagnosis result is a failure, the memory controller 311 may determine that an uncorrectable error has occurred in a non-volatile memory, and operation S100 of verifying whether the storage device may be continued to be used may be terminated in a state where the RAID configuration signal RAID CONFIG has been deactivated.

On the other hand, if the self-diagnosis result is determined to be a success in S140, in operation S150, the memory controller 311 may generate a RAID activation request signal. The memory controller 311 may provide the RAID activation request signal to the RAID controller 200. The RAID controller 200 may activate a RAID configuration signal RAID CONFIG based on the RAID activation request signal. If the RAID configuration signal RAID CONFIG is activated, the RAID operation for a plurality of non-volatile memories 312_1 to 312_4 may be performed.

Figure 6:
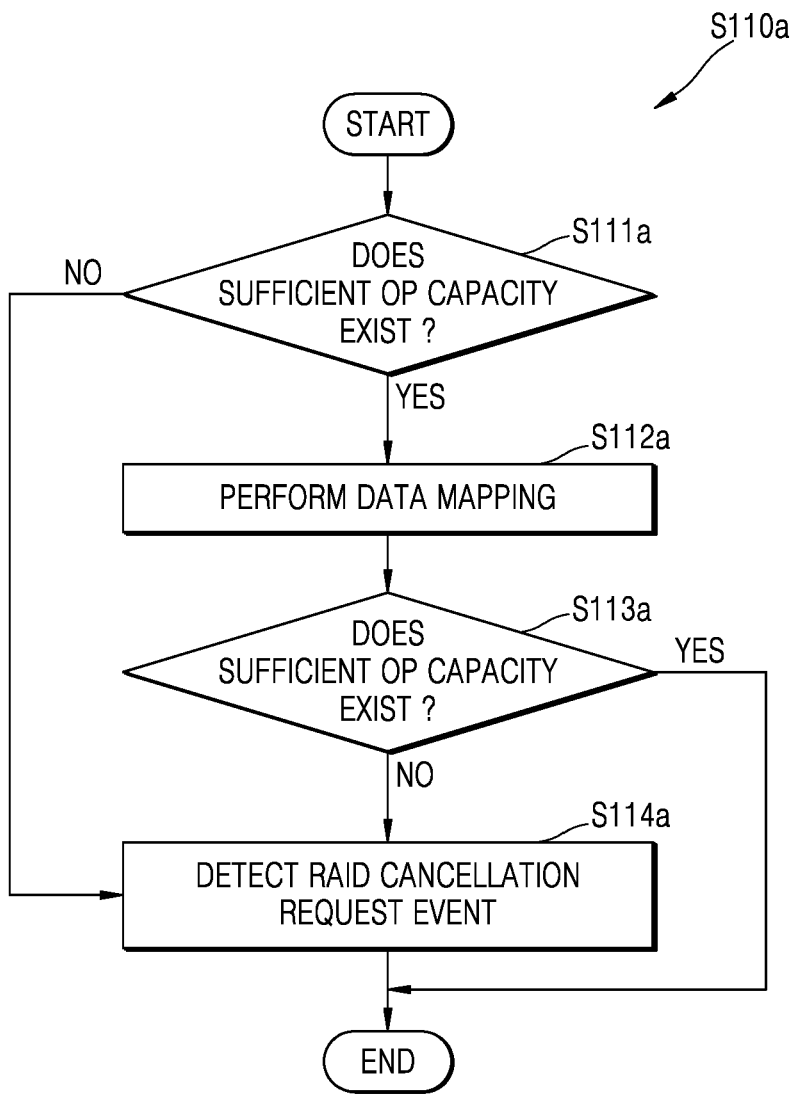
FIG. 6 is a flowchart illustrating an operation of detecting a RAID cancellation request event, according to an embodiment.

FIG. 6 is a flowchart illustrating an operation of detecting a RAID cancellation request event, according to an embodiment. FIG. 6 may be an embodiment of operation S110 of FIG. 5. FIG. 6 shows a case where a memory controller 311 detects a RAID cancellation request event when an over provisioning (OP) capacity is insufficient. Herein, the OP area may mean providing additional storage capacity over the designated storage capacity of the memory area. For example, a storage device may provide an address space (which might be a continuous range of logical addresses, e.g.) for storing user data, and an OP capacity may be the storage capacity over the storage amount available for storing user data associated with that address space. In some examples, the additional capacity provided by OP may be used to implement garbage collection and wear leveling by the memory controller 311 in a non-volatile memory. In some examples, an OP area may be and/or provide redundant memory that may be used to replace defective memory (e.g., bad pages, bad columns, or bad blocks of memory are replaced by corresponding redundant pages, redundant columns or redundant blocks provided by OP). During use of the non-volatile memories 312_i of the memory set 312, program/erase cycles or other phenomena may cause some pages, columns and/or blocks of memory of the non-volatile memories 312_i to be identified as bad and thus no longer usable (e.g., data retention in the identified bad blocks fails to meet certain criteria, such as a block including a page in which a number of error bits exceeds a threshold when storing data therein). As the portions of the non-volatile memory identified as bad increases, the remaining over provisioning (OP) amount of the memory set 312 decreases. The RAID cancellation request event detection operation S110a of FIG. 6 may include operations S111a to S114a.

In operation S111a, the memory controller 311 may determine whether there is sufficient OP capacity or area in each non-volatile memory 312_i of its corresponding non-volatile memory set 312 (or a group of its non-volatile memories 312_i, such as a group of its non-volatile memories 312_i associated with a single channel (e.g., CH1 or CH2)). Operation S111a may include a bad block detection operation which may include determining which portions of the non-volatile memory are considered bad (e.g., considered defective). If there is sufficient remaining OP area in a non-volatile memory 312_i (or a group of non-volatile memories 312_i), operation S112a may be performed, and if there is insufficient remaining OP area in a non-volatile memory 312_i of its memory set 312 (or a group of its non-volatile memories 312_i), operation S114a may be performed.

In operation S112a, data mapping may be performed. For example, if a bad block is identified among the memory blocks of a non-volatile memory, data mapping of data remaining in the bad block to a free block of the non-volatile memory 312_i, e.g., of the OP area, may be performed. The memory controller 311 may map data in the bad block (e.g., data designated as valid data) to the free block which may be part of the OP area in order to prevent/reduce data loss in the bad block. Herein, the data mapping may mean transferring data in the bad memory block to the free memory block and updating the address mapping of the logical address of the bad block to be associated with the physical address of the new (previously free) block (e.g., in FTL 311_4, such as in a physical to logical mapping table of FTL 311_4).

In operation S113a, it is possible to determine whether there is sufficient OP capacity or area (e.g., as was determined in operation S111a). Even though data mapping has been performed in operation S112a, when additional data mapping is necessary during future operations, if there is insufficient OP area, data may be lost. In order to prevent this, the memory controller 311 may determine whether there is sufficient OP area one more time in operation S113a after operation S111a. If there is insufficient OP area in the non-volatile memory (or non-volatile memories of a group providing blocks as part of the same garbage collection function), operation S114a may be performed.

In operation S114a, the memory controller 311 may detect a RAID cancellation request event. For example, if the memory controller 311 determines that there is insufficient remaining OP capacity or area in operation S111a or determines that there is insufficient remaining OP capacity or area in operation S113a, the memory controller 311 may detect the same as a RAID cancellation request event.

Figure 7:
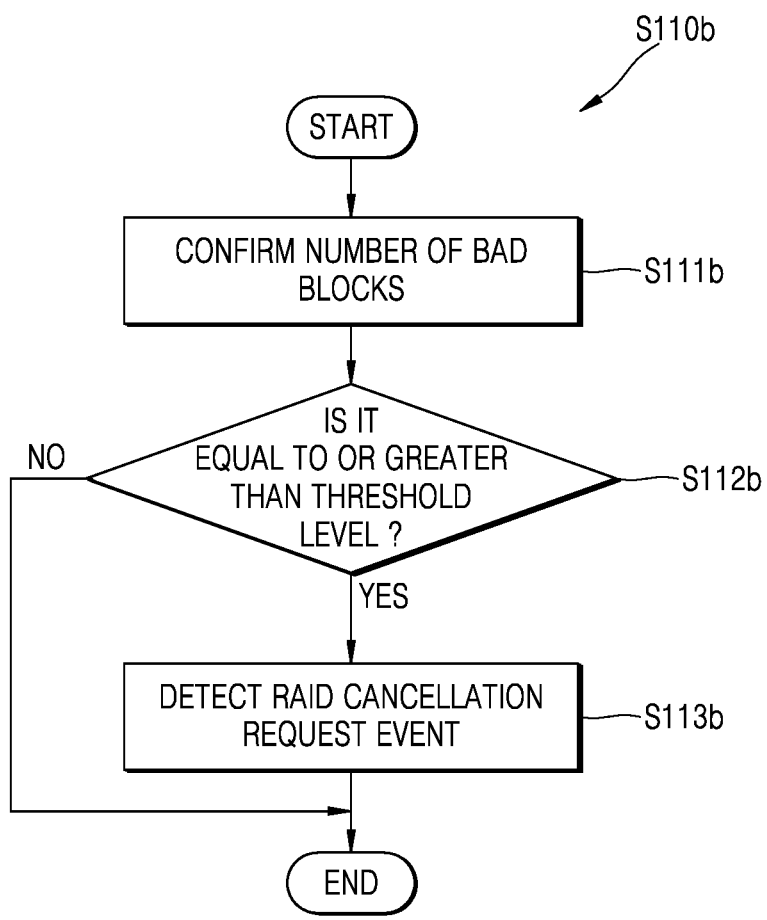
FIG. 7 is a flowchart illustrating an operation of detecting a RAID cancellation request event, according to another embodiment.

FIG. 7 is a flowchart illustrating an operation of detecting a RAID cancellation request event, according to another example. FIG. 7 may be implemented as another embodiment of operation S110 of FIG. 5. FIG. 7 shows a case where the memory controller 311 detects a RAID cancellation request event when the number of bad blocks in a non-volatile memory is equal to or greater than a threshold level. The RAID cancellation request event detection operation S110b of FIG. 7 may include operations S111b to S113b.

In operation S111b, the memory controller 311 may check the number of bad blocks in the non-volatile memory. In the inventive concept, a bad block may mean a memory block in which an error correction is not made due to physical or logical damage. For example, the memory block may include a page having data stored therein with an ECC code associated with the data, wherein the maximum number of bits the ECC code is able to correct is less than the number of erroneous bits in the data. A bad block may also refer to a memory block in which an error correct capability approaches or is close to being insufficient to correct errors in data, such as requiring a refresh operation at a frequency that exceeds a certain time period, or having a number of bit errors at or offset by one (or two or some other predetermined integer) from the maximum number of bit errors the ECC code is able to correct. Note that a block of memory may comprise a plurality of pages of memory and that if only a single page of the memory block is considered bad, the entire block may be considered bad. In other examples, one or more bad pages may be replaced (via remapping to different corresponding physical page(s) in a replacement block(s)) and the block with a bad page may not be identified as a bad block until a predetermined number of bad pages in the block are identified as bad pages. Upon identifying a block of the non-volatile memory as being a bad block, any valid data may be transferred to a free block, and the bad block may no longer be used (e.g., no further data will be written to the bad block).

Operation S111b may be performed through using the ECC engine in the memory controller 311, as shown in FIG. 4. The ECC engine 311_6 may indicate that errors in data read from the non-volatile memory are uncorrectable to identify the block containing this data as a bad block. Memory controller 311 may determine the number of bad blocks by tracking blocks in the non-volatile memory having data with such uncorrectable errors (or tracking other characteristics that identify a bad block as described elsewhere herein).

Furthermore, operation S111b may be performed by reading data about bad blocks in the memory controller 311. The memory controller 311 may store data about bad blocks after error detection for the non-volatile memory. Therefore, the memory controller 311 may determine the number of bad blocks in the non-volatile memory by reading data on bad blocks.

In operation S112b, the memory controller 311 may determine whether the number of bad blocks in the non-volatile memory is equal to or greater than a threshold level. If the number of bad blocks is equal to or greater than the threshold level, operation S113b may be performed. The threshold level may vary depending on conditions, such as the process, design, and the use environment of the non-volatile memory.

In operation S113b, the memory controller 311 may detect a RAID cancellation request event. For example, if it is determined that the number of bad blocks in the non-volatile memory is equal to or greater than the threshold level in operation S112b, the memory controller 311 may determine the same as a RAID cancellation request event.

Figure 8:
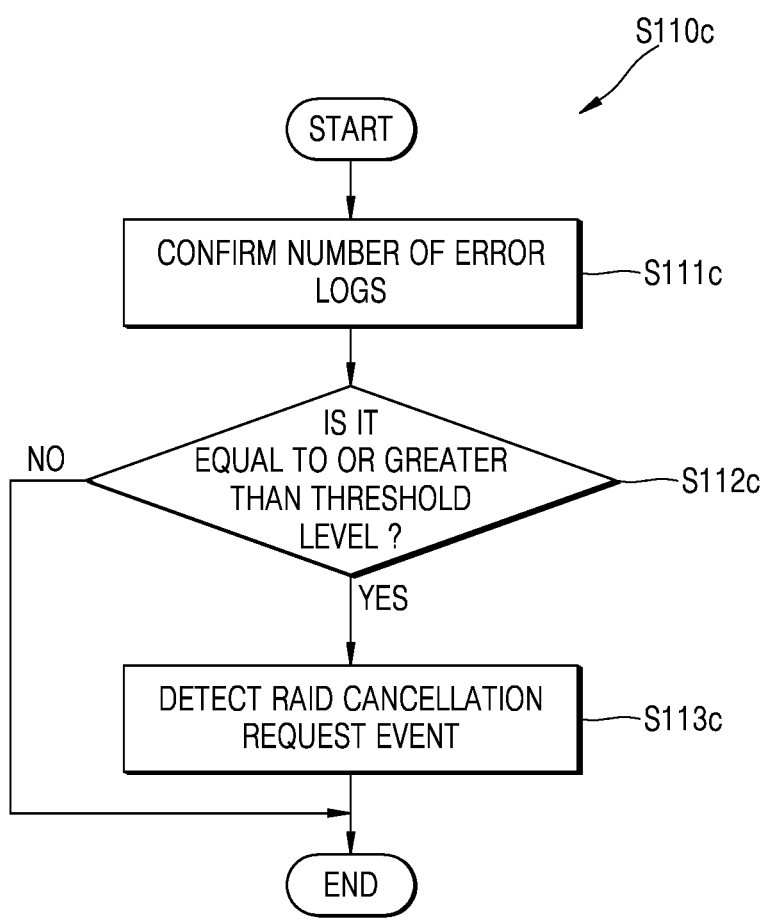
FIG. 8 is a flowchart illustrating an operation of detecting a RAID cancellation request event, according to another embodiment.

FIG. 8 is a flowchart illustrating an operation of detecting a RAID cancellation request event, according to another example. FIG. 8 may be implemented as another embodiment of operation S110 of FIG. 5. FIG. 8 shows a case where the memory controller 311 detects a RAID cancellation request event when the number of error logs for a non-volatile memory is equal to or greater than a threshold level.

The RAID cancellation request event detection operation S110c of FIG. 8 may include operations S111c to S113c.

In operation S111c, the memory controller 311 may check the number of error logs for the non-volatile memory. In the inventive concept, the error log may mean a record about a non-volatile memory where an error has occurred.

Operation S111c may be performed using the ECC engine 311_6 in the memory controller 311 shown in FIG. 4. The ECC engine 311_6 may detect errors in read data, which is read from a non-volatile memory, and such errors stored as error logs by the memory controller 311. The number of error logs associated with a non-volatile memory may determine if a RAID cancellation request event is detected.

Furthermore, operation S111c may be performed by reading data of the error logs of the memory controller 311. The memory controller 311 may store error log data after error detection for the non-volatile memory by ECC engine 311_6. Therefore, the memory controller 311 may determine the number of error logs in the non-volatile memory by reading the error log data.

In operation S112c, the memory controller 311 may determine whether the number of error logs in the non-volatile memory is equal to or greater than a threshold level. If the number of error logs is equal to or greater than the threshold level, operation S113c may be performed. The threshold level may vary depending on conditions, such as the process, design, and the use environment of the non-volatile memory.

In operation S113c, the memory controller 311 may detect a RAID cancellation request event. For example, if it is determined that the number of error logs in the non-volatile memory is equal to or greater than the threshold level in operation S112b, the memory controller 311 may determine the same as a RAID cancellation request event.

In the inventive concept, a case where an extra OP area is insufficient in FIG. 6, a case where the number of bad blocks is equal to or greater than a threshold level in FIG. 7, and a case where the number of error logs is equal to or greater than a threshold level are used as examples of RAID cancellation request events. However, the inventive concept is not limited thereto. For example, when the temperature of the non-volatile memory is equal to or greater than a threshold level may be detected as a RAID cancellation request event. For example, when the number of program/erase (PE) cycles of the non-volatile memory is equal to or greater than a threshold level, the memory controller 311 may determine the same as a RAID cancellation request event.

Figure 9:
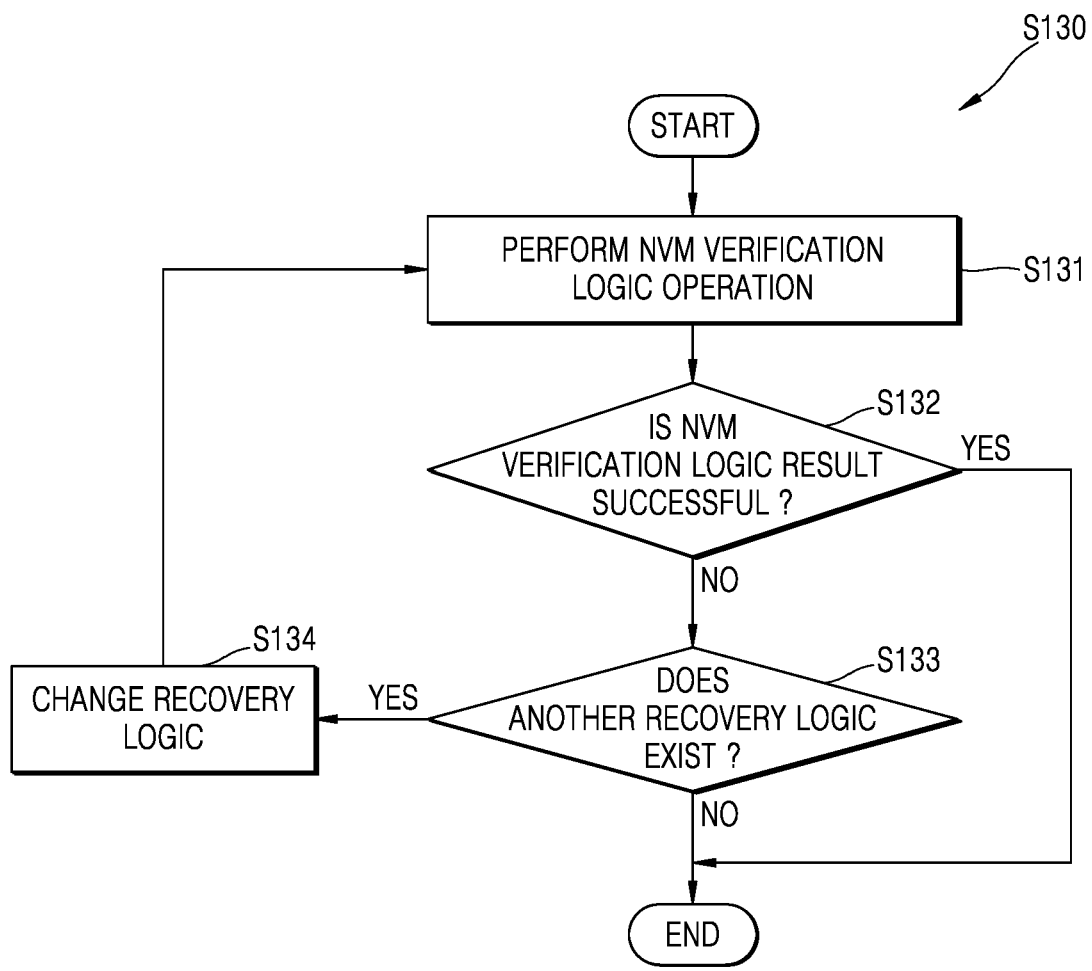
FIG. 9 is a flowchart illustrating the self-diagnosis operation according to an embodiment.

FIG. 9 is a flowchart illustrating the self-diagnosis operation according to an embodiment. The self-diagnosis operation S130 may include operations S131 to S134. The self-diagnosis operation S130 of FIG. 9 may correspond to operation S130 of FIG. 5.

In operation S131, the memory controller 311 may perform a verification logic operation for the non-volatile memory. The detailed operation of operation S131 will be described with reference to FIG. 10.

In operation S132, the memory controller may determine the result of the verification logic operation for the non-volatile memory. If the verification log result for the non-volatile memory is a failure, operation S133 may be performed. If the verification log result for the non-volatile memory is a success, the self-diagnosis operation S130 for the non-volatile memory may be terminated.

In operation S133, the memory controller 311 may determine whether there is another recovery logic. In the inventive concept, another recovery logic may mean a recovery logic capable of affecting verification logic operations such as firmware and defense codes. When the recovery logic is changed, the verification log result for the non-volatile memory may be changed. Accordingly, the memory controller 311 may determine whether there is another recovery logic. If there is another recovery logic, operation S134 may be performed, and if there is no recovery logic, the self-diagnosis result for the non-volatile memory may be terminated as a failure.

In operation S134, the recovery logic may be changed. When it is possible to update firmware, the memory controller 311 may send a firmware update request to the host 100 through the RAID controller 200. As described above with reference to FIG. 5, the firmware update request may be performed in operation S120 or in operations S131 to S134 after operation S120. The host 100 may deliver updated firmware to the memory controller 311 through the RAID controller 200, in response to the request of the memory controller 311. The recovery logic may be changed as the memory controller 311 installs the received firmware in the memory controller 311.

In other embodiments, the recovery logic may be changed through defense code change. For example, the memory controller 311 may send a defense code update request to the host 100 through the RAID controller 200. The host 100 may deliver a updated defense code to the memory controller 311 through the RAID controller 200, in response to the request of the memory controller 311. The recovery logic may be changed as the memory controller 311 installs the received defense code in the memory controller 311. In the inventive concept, the defense code may mean a code used to correct or recover a read error.

After operation S134, self-diagnosis operation S130 of the memory controller 311 may be repeated until the verification log result for the non-volatile memory becomes a success in operation S132 or no other recovery logic exists in operation S133 by going back to operation S131.

Figure 10:
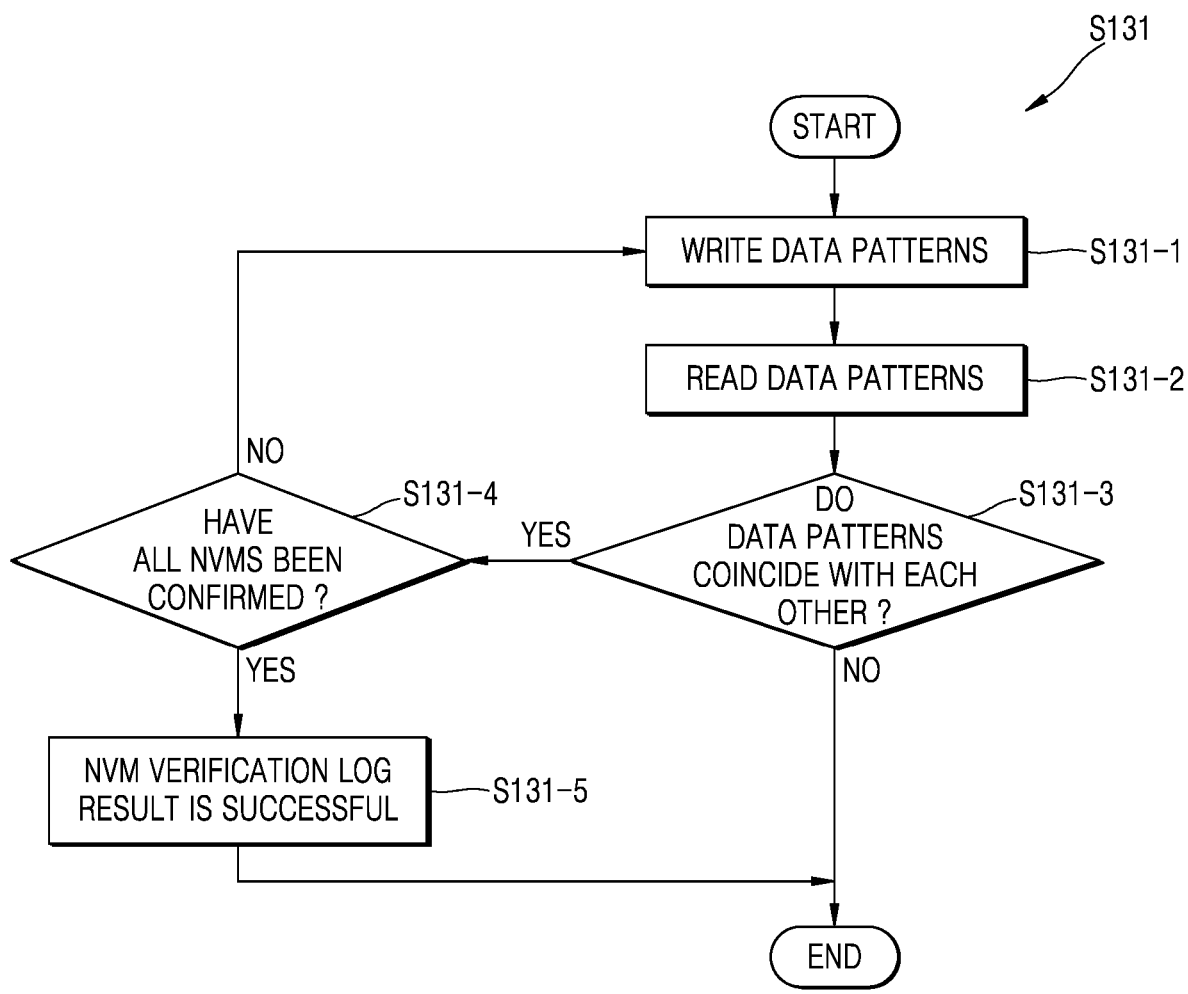
FIG. 10 is a flowchart illustrating a non-volatile memory verification operation according to an embodiment.

FIG. 10 is a flowchart illustrating a verification logic operation for a non-volatile memory according to an embodiment. The verification logic operation of FIG. 10 may correspond to operation S131 of FIG. 9. FIG. 10 shows an embodiment of the verification logic operation, and the inventive concept is not limited thereto.

The verification logic operation of FIG. 10 may include operations S131-1 to S131-5.

In operation S131-1, the memory controller 311 may write a data pattern on an arbitrary first area in a first non-volatile memory 312_1 among non-volatile memories. For example, referring to FIG. 3, the memory controller 311 may write a data pattern in the first area (not shown) of the first non-volatile memory 312_1. In some embodiments, the data pattern may mean data having an arbitrary pattern such as 01010101. In other embodiments, the data pattern may be a value obtained by extracting data stored in an arbitrary storage area. In the inventive concept, the verification logic operation for the first non-volatile memory 312_1 was performed first, but the order of the verification logic operation may be changed variously. For example, the verification logic operation for the third non-volatile memory 312_3 may be performed first.

In operation S131-2, the memory controller 311 may read a data pattern from the first area of the first non-volatile memory 312_1.

In operation S131-3, the memory controller 311 may determine whether the data pattern, which has been read in operation S131-2, is identical to the data pattern which has been written in operation S131-1. If the data patterns coincide with each other, the memory controller 311 may determine that the writing and reading of the first non-volatile memory 312_1 in and from the first area (not shown) was normally performed. Hence, when the data patterns coincide with each other, the memory controller 311 may determine that the first non-volatile memory 312_1 may be continued to be used.

On other hand, if the data patterns do not coincide with each other, the memory controller 311 may determine that the writing and reading of the first non-volatile memory 312_1 in and from the first area (not shown) was not normally performed. Hence, when the data patterns do not coincide with each other, the memory controller 311 may determine that the first non-volatile memory 312_1 should not be continued to be used. Note that the arbitrary first area may be randomly selected (or alternatively, selected as part of a programmed sequence) and constitute only a portion of the first non-volatile memory 312_1 (i.e., the first area) may be evaluated with the verification logic of FIG. 10. However, operations S131-1 to S131-3 also may be performed (in parallel or in a repetitive sequence or otherwise) for additional areas of the first non-volatile memory 312_1 to evaluate all data storage areas of the non-volatile memory 312_1 with the verification logic of FIG. 10.

In operation S131-4, it may be determined whether the verification logic operation for all non-volatile memories 312_1 to 312_4 has been performed. If the verification logic operation for all non-volatile memories 312_1 to 312_4 has been performed, operation S131-5 may be performed. On the other hand, if the verification logic operation for all non-volatile memories has not been completed, the process may go back to operation S131-1, and operations S131-1 to S131-3 may be repeated.

In operation S131-5, the memory controller 311 may determine that the verification log result for all non-volatile memories 312_1 to 312_4 connected to the memory controller 311 is a success.

Figure 11:
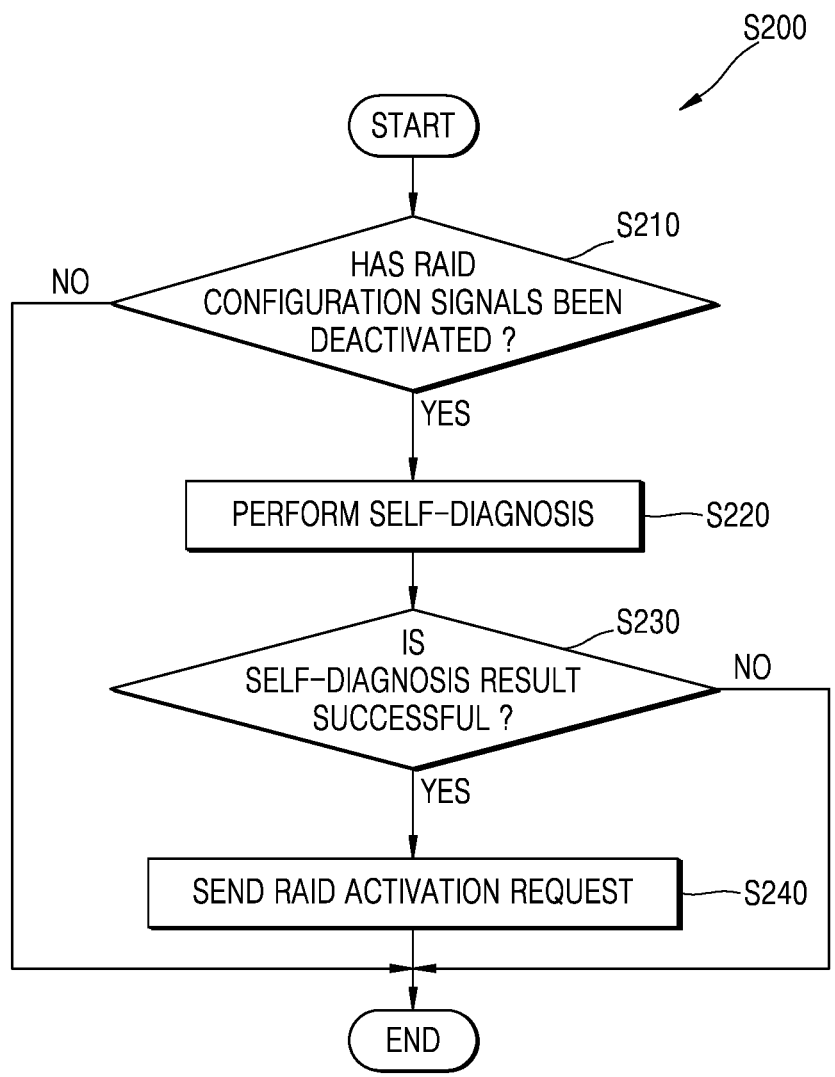
FIG. 11 is a flowchart illustrating an operation of verifying whether a storage device may be continued to be used, according to another embodiment.

FIG. 11 is a flowchart illustrating an operation of verifying whether a storage device may be continued to be used, according to another embodiment. FIG. 11 may be compared with FIG. 5. FIG. 5 shows operation S100 of verifying whether the first storage device 310 may be continued to be used when the memory controller 311 detects a RAID cancellation request event. On the other hand, FIG. 11 shows operation S200 of verifying whether the first storage device 310 may be continued to be used when the host 100 sends a RAID deactivation request to the RAID controller 200.

The host 100 may generate a second deactivation request signal and provide the second deactivation request signal to the RAID controller 200. The RAID controller 200 may deactivate a RAID configuration signal RAID CONFIG based on the second deactivation request signal.

Operation S200 of verifying whether the first storage device 310 may be continued to be used of FIG. 11 may include operations S210 to S240.

In operation S210, the memory controller 311 may determine whether the RAID configuration signal RAID CONFIG received from the RAID controller 200 has been deactivated. If the RAID configuration signal RAID CONFIG has not been deactivated, it means that the first storage device 310 is currently performing the RAID operation. Hence, operation S200 of verifying whether the storage device may be continued to be used may be terminated. If the RAID configuration signal RAID CONFIG has been deactivated, operation S220 may be performed.

In operation S220, the memory controller 311 may perform the self-diagnosis operation for a plurality of non-volatile memories 312_1 to 312_4. As explained above with reference to FIG. 5, the detailed operation for the self-diagnosis operation may be the same as that (S130) explained with reference to FIGS. 9 and 10.

In operation S230, the self-diagnosis result may be determined. If the self-diagnosis result is a success, operation S240 may be performed. If the self-diagnosis result is a failure, in operation S230, operation S200 of verifying whether the storage device may be continued to be used may be terminated when the RAID configuration signal RAID CONFIG has been deactivated.

In operation S240, the memory controller 311 may generate a RAID activation request signal. The memory controller 311 may provide the generated RAID activation request signal to the RAID controller 200. The RAID controller 200 may activate a RAID configuration signal RAID CONFIG based on the RAID activation request signal. If the RAID configuration signal RAID CONFIG is activated, the RAID operation for a plurality of non-volatile memories 312_1 to 312_4 may be performed.

Figure 12:
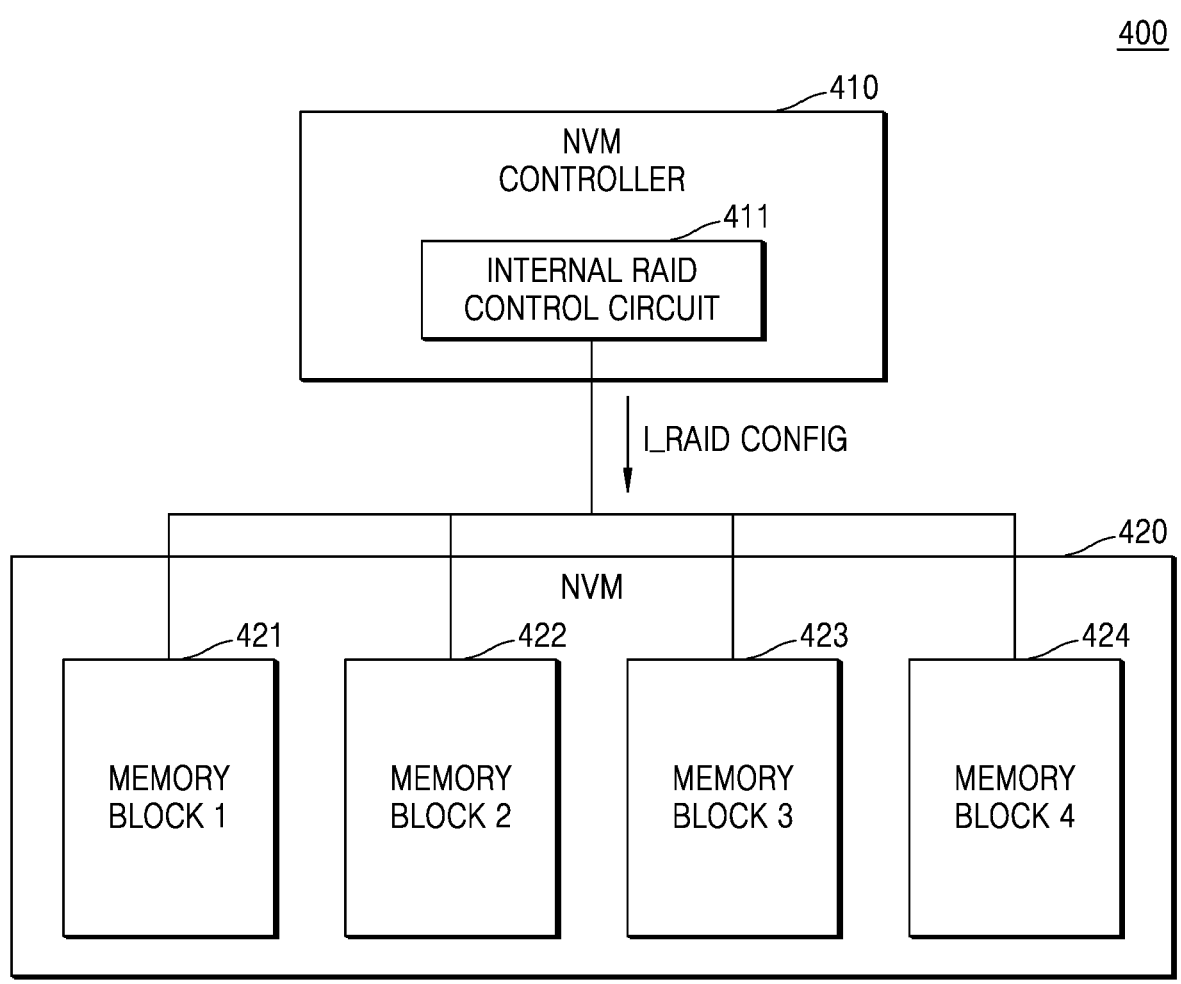
FIG. 12 is a block diagram illustrating a storage device according to another embodiment.

FIG. 12 is a block diagram illustrating a storage device according to another embodiment. Referring to FIG. 12, a storage device 400 may include a memory controller 410 and a non-volatile memory 420.

The storage device 400 of FIG. 12 may be similar to the first to third storage devices 310, 320, and 330 of FIG. 2. FIG. 2 shows a storage system 20 which performs external RAID. In FIG. 2, the RAID controller 200 controls the RAID operation of a plurality of storage devices 310 to 330. On the other hand, FIG. 12 shows the storage device 400 which performs the internal RAID. Namely, the storage device 400 of FIG. 12 may include an internal RAID control circuit 411 in the storage device 400 to control the internal RAID operation for a plurality of memory blocks 421 to 424. For the convenience of the description, the description on the same matters as the embodiments described with reference to FIGS. 2 to 11 may be omitted and the description will focus on the difference.

The internal RAID control circuit 411 according to the inventive concept may actually operate in the same manner as the RAID controller 200 described with reference to FIG. 2. Herein, the storage system 20 of FIG. 2 includes a separate RAID controller 200 at an external side of the first to third storage devices 310, 320, and 330, but the storage device 400 of FIG. 12 may include an internal RAID control circuit 411 which controls the internal RAID operation.

The internal RAID operation does not require that the operation in which a RAID controller controls plural external storage devices (e.g., such as storage devices 310, 320, and 330) or controls the RAID operation of plural non-volatile memory devices (e.g., such as 312_1 to 312_4, 322_1 to 322_4 and 332_1 to 332_4 inside a storage device) as explained in FIG. 2, but it may refer the operation in which the internal RAID control circuit 411 inside the storage device 400 performs the RAID operation with respect to a plurality of memory blocks 412 to 424 of the non-volatile memory 420. As shown, the RAID control circuit 411 may be a circuit of the memory controller 410. The memory controller 410 and the non-volatile memory 420 may each constitute separate devices, such as embodied in separate respective semiconductor chips or separate respective semiconductor packages.

FIG. 12 illustrates one non-volatile memory 420 for the convenience of explanation, but the inventive concept is not limited thereto, and the storage device 400 may include a plurality of non-volatile memories, such as the memory set 312, with its connections and operations, as described with respect to FIG. 3 and elsewhere herein.

The non-volatile memory 420 may include a plurality of memory blocks. FIG. 12 shows first to fourth memory blocks 421 to 424, however, additional memory blocks maybe provided and organized and operated in the same manner as described with respect to first to fourth memory blocks 421 to 424. In some examples, with respect to a RAID configuration, the first to fourth memory blocks 412 to 424 may correspond to first to fourth non-volatile memories 312_1 to 312_4, 322_1 to 322_4 and 332_1 to 332_4 of FIG. 2.

The non-volatile memory 420 may include first to n-th pages (wherein n is a natural number). The first to n-th pages may be arranged in the first to fourth memory blocks 421 to 424 which are different from each other.

The memory controller 410 may control the non-volatile memory 420. That is, the memory controller 410 may perform operations of reading, writing, and erasing data on the first to fourth memory blocks 421 to 424 through a program.

The memory controller 410 may receive data from a host (not shown). The data may be transmitted to perform a write command to the first to fourth memory blocks 421 to 424. The data may include ECC.

The memory controller 410 may generate an internal RAID parity using first to (n−1)-th data. The internal RAID parity may be used in determining whether there is an error in data during the internal RAID process of connecting first to fourth memory blocks 421 to 424 in parallel and using the first to fourth memory blocks 421 to 424 in a RAID configuration. One or a plurality of internal RAID parities may be used, depending on the internal RAID scheme. Further, one internal RAID parity may be copied several times.

For example, the memory controller 410 may generate an internal RAID parity using first to third data. First to third data may be programmed in first to third pages, and the generated internal RAID parity may be programmed in a fourth page included in one of the first to fourth memory blocks 421 to 424. However, the inventive concept is not limited thereto, and the memory controller 410 may drive the internal RAID using more memory blocks.

The internal RAID control circuit 411 may generate an internal RAID configuration signal I_RAID CONFIG used for determining whether to operate the internal RAID of the non-volatile memory 420, and transmit the internal RAID configuration signal I_RAID CONFIG to the memory controller 410. The internal RAID configuration signal I_RAID CONFIG may indicate whether to turn on or off the internal RAID operation. The memory controller 410 may control first to fourth memory blocks 421 to 424 to allow data to be distributed and stored in first to fourth memory blocks 421 to 424 by controlling the internal RAID operation for the first to fourth memory blocks 421 to 424, based on the internal RAID configuration signal I_RAID CONFIG received from the internal RAID control circuit 411.

The memory controller 410 may perform self-diagnosis for a plurality of memory blocks 421 to 424 to determine whether at least one of the first to fourth memory blocks 421 to 424 has an uncorrectable error. The memory controller 410 may transfer data of the plurality of memory blocks 421 to 424 to another non-volatile memory, etc. in order to perform self-diagnosis on the plurality of memory blocks 421 to 424. Thereafter, the memory controller 410 may deactivate the internal RAID configuration signal I_RAID CONFIG and perform self-diagnosis on the plurality of memory blocks 421 to 424. If the result of the self-diagnosis is a success, the internal RAID control circuit 411 may activate the internal RAID configuration signal I_RAID CONFIG. The detailed operation of the self-diagnosis may be the same as that (S130) explained with reference to FIGS. 9 and 10.

The memory controller 410 may detect the RAID cancellation request event of at least one of first to fourth memory blocks 421 to 424 and deactivate the internal RAID configuration signal I_RAID CONFIG at the time of detecting the RAID cancellation request event. For example, if the P/E cycles of the non-volatile memory 420 (or one of its memory blocks 421 to 424) is equal to or greater than the threshold level, or the temperature of the non-volatile memory 420 is equal to or greater than the threshold level, the memory controller 410 may detect a RAID cancellation request event. The detailed operation of the RAID cancellation request event may be the same as that explained with reference to FIG. 5 described above.

The host may generate an internal RAID deactivation request signal and provide the internal RAID deactivation request signal to the internal RAID control circuit 411. The internal RAID control circuit 411 may deactivate the internal RAID configuration signal I_RAID CONFIG in response to receiving the internal RAID deactivation request signal. In response to the internal RAID configuration signal I_RAID CONFIG is deactivated, the self-diagnosis for the first to fourth memory blocks 421 to 424 is performed. When the host sends an internal RAID deactivation request to the internal RAID control circuit 411, the operation of verifying whether the memory 420 may be continued to be used may be the same as that described with reference to FIG. 11.

Figure 13:
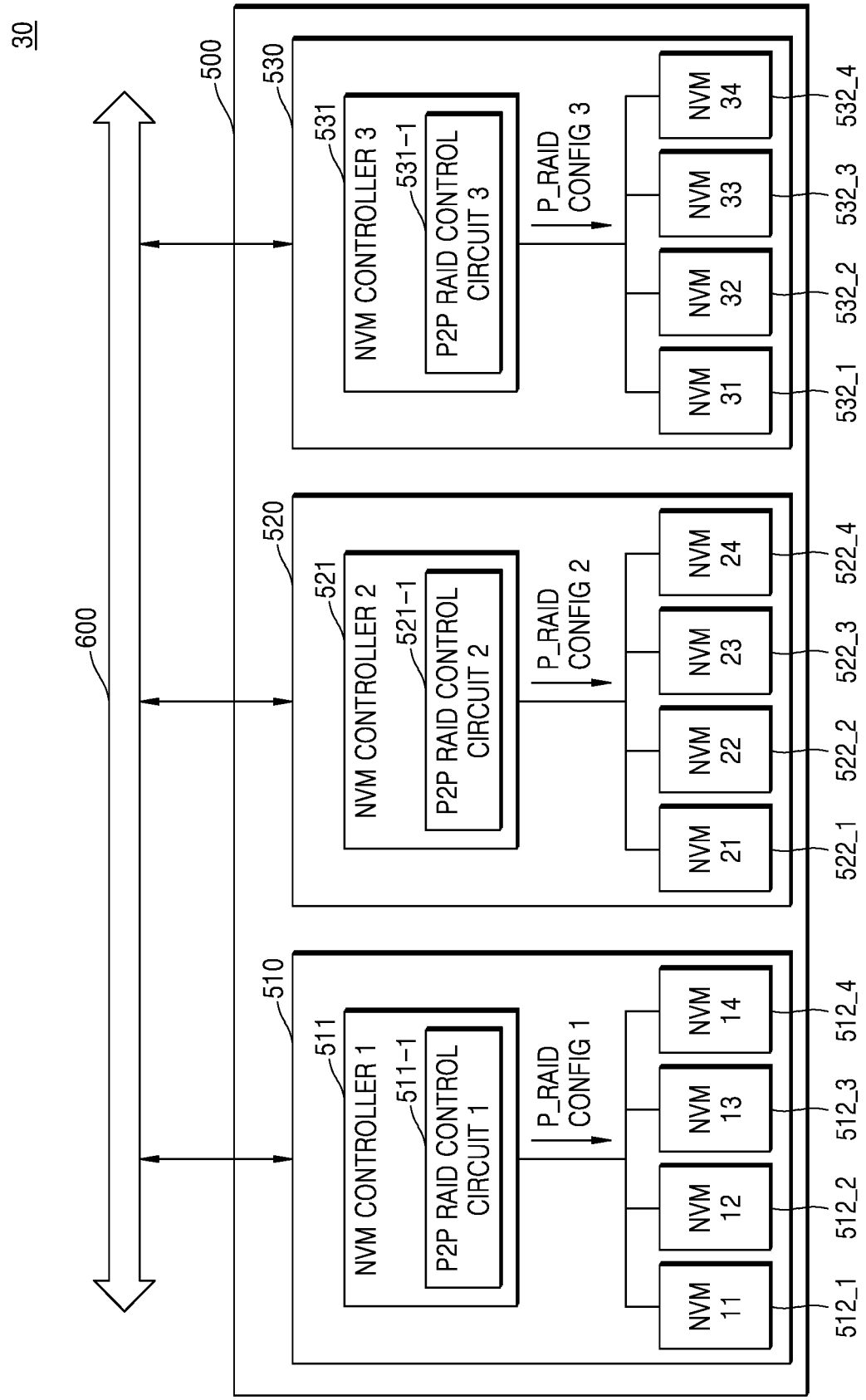
FIG. 13 is a block diagram illustrating a storage system according to another embodiment.

FIG. 13 is a block diagram illustrating a storage system according to another embodiment. Referring to FIG. 13, a storage system 30 may include a data bus 600 and a storage device set 500.

The data bus 600 may be used for transmission and reception of data between storage devices 510 to 530.

The storage device set 500 may include first to third storage devices 510 to 530, and each of storage devices 510, 520 and 530 may include corresponding ones of memory controllers 511, 521 and 531 and corresponding first to fourth non-volatile memories. Each memory controller may include each of P2P RAID control circuits 511-1, 521-1 and 531-1.

Each of storage devices 510, 520 and 530 of FIG. 13 may be may be the same as one of the first to third storage devices 310, 320, and 330 of FIG. 2, except that the memory controllers 511, 521 and 531 each include a P2P RAID control circuit. FIG. 2 shows a storage system 20 which performs external RAID. In FIG. 2, the RAID controller 200 controls the RAID operation of a plurality of storage devices 310 to 330. On the other hand, FIG. 13 shows a storage system 30 which performs peer to peer (P2P) RAID. Storage devices 510, 520 and 530 of FIG. 13 may allow P2P RAID control circuits 511-1, 521-1 and 531-1 to control P2P RAID operations of the plurality of storage devices 510, 520 and 530.

In the external RAID of FIG. 2, when performing a self-diagnosis for non-volatile memories 312-1 to 312-4, 322-1 to 322-4 and 332-1 to 332-4 under the intervention of the RAID controller 200, data transfer may be performed. On the other hand, in the P2P RAID of FIG. 13, data transfer between storage devices 510 to 530 may be performed without intervention of the host or the RAID controller 200 outside the storage device set 500.

For example, when the self-diagnosis is performed as a result of generation of a RAID cancellation request event in the third non-volatile memory 512_3 of the first storage device 510, the first P2P RAID control circuit 511-1 may send a data transfer request to the second P2P RAID control circuit 521-1 and the third P2P RAID control circuit 531-1. In response to the data transfer request, the second P2P RAID control circuit 521-1 may allocate a storage space for data to be transferred to the first to fourth non-volatile memories 522_1 to 522_4 and deactivate the P2P RAID configuration signal. Likewise, in response to the data transfer request, the third P2P RAID control circuit 531-1 may allocate a storage space for data to be transferred to the first to fourth non-volatile memories 532_1 to 532_4.

If allocation of a storage space for data transfer is performed, data, which is stored in the third non-volatile memory 512_3 of the first storage device 510, may be transferred to first to fourth non-volatile memories 522_1 to 522_4 of the second storage device 520, and first to fourth non-volatile memories 532_1 to 532_4 of the third storage device 530. If the self-diagnosis result for the third non-volatile memory 512_3 of the first storage device 510 is a success, data, which has been stored in the second and third storage devices 520 and 530, may be transferred again to the third non-volatile memory 512_3 of the first storage device 510, and the P2P RAID control circuit 511-1 may activate the P2P RAID configuration signal.

P2P RAID control circuits 511-1, 521-1 and 531-1 according to the inventive concept may operate substantially the same as the RAID controller 200 described with reference to FIG. 2 except that the P2P RAID control circuits 511-1, 521-1 and 531-1 are configured to actuate data transfer between the storage devices 510 to 530 connected by the data bus 600.

For the convenience of the description, the description on the same matters as the embodiments described with reference to FIGS. 2 to 11 may be omitted and the description will focus on the difference.

FIG. 13 shows first to third storage devices 510 to 530 for the convenience of explanation, but the inventive concept is not limited thereto, and 4 or more storage devices may be provided. In some embodiments, if it is determined that any storage device is not continually usable after self-diagnosis, P2P RAID connection of the storage device may be cancelled. In this case, the fourth storage device, which receives all data of the P2P RAID connection-cancelled storage device, may perform P2P RAID operation instead of the P2P RAID connection-cancelled storage device.

The description about the RAID operation such as generation of a RAID parity, which is performed in the storage devices 510, 520 and 530, may be the same as that described with reference to FIG. 2.

P2P RAID control circuits 511-1, 521-1 and 531-1 may generate P2P RAID configuration signals P_RAID CONFIG 1, P_RAID CONFIG 2 and P_RAID CONFIG 3, which are used to determine whether to perform P2P RAID operation of the non-volatile memory, and transmit the P2P RAID configuration signals P_RAID CONFIG 1, P_RAID CONFIG 2 and P_RAID CONFIG 3 to the memory controller. The P2P RAID configuration signals P_RAID CONFIG 1, P_RAID CONFIG 2 and P_RAID CONFIG 3 may indicate whether to turn on or off the P2P RAID operation. The memory controller may control the first to fourth non-volatile memories 512_1 to 512_4, 522_1 to 522_4, and 532_1 to 532_4 to allow data to be distributed and stored in the first to fourth non-volatile memories 512_1 to 512_4, 522_1 to 522_4, and 532_1 to 532_4 by controlling the P2P RAID operation for the first to fourth non-volatile memories 512_1 to 512_4, 522_1 to 522_4, and 532_1 to 532_4 based on P2P RAID configuration signals P_RAID CONFIG 1, P_RAID CONFIG 2 and P_RAID CONFIG 3 received from the P2P RAID control circuit.

As explained with reference to FIG. 2, the P2P RAID operation does not require an operation in which the RAID controller 200 outside the first to third storage devices 310, 320, and 330 controls the RAID operation of non-volatile memories 312_1 to 312_4, 322_1 to 322_4 and 332_1 to 332_4 inside the first to third storage devices 310, 320, and 330 and may instead refer to an operation in which P2P RAID control circuits 511-1, 521-1 and 531-1 inside the storage devices 510, 520 and 530 perform the RAID operation for the non-volatile memories 512_1 to 512_4, 522_1 to 522_4, and 532_1 to 532_4. When compared with the internal RAID operation of FIG. 12, the internal RAID control circuit 411 of FIG. 12 may perform the RAID operation for each of the memory blocks 421, 422, 423 and 424 of the non-volatile memory 420, but the P2P RAID control circuits 511-1, 521-1 and 531-1 of FIG. 13 may perform the RAID operation for each of the non-volatile memories 512_1 to 512_4, 522_1 to 522_4, and 532_1 to 532_4 in the storage devices 510, 520 and 530. In another embodiment, the P2P RAID operation may be performed by forming a stripe in some or all of the P2P RAID control circuits. For example, the P2P RAID operation is not performed by for each of the non-volatile memories, and the P2P RAID operation may be performed as part or whole of the non-volatile memories 512_1 to 532_4.

When error logs such as repeated operations of defense codes for the same area are accumulated, the memory controllers 511, 521 and 531 may deactivate the area in the RAID and perform self-diagnosis on first to fourth non-volatile memories 512_1 to 512_4, 522_1 to 522_4, and 532_1 to 532_4 in order to determine whether at least one of the first to fourth non-volatile memories 512_1 to 512_4, 522_1 to 522_4, and 532_1 to 532_4 has an uncorrectable error. If the self-diagnosis result is a success, P2P RAID control circuits 511-1, 521-1 and 531-1 may activate P2P RAID configuration signals P_RAID CONFIG 1, P_RAID CONFIG 2 and P_RAID CONFIG 3. The detailed operation of the self-diagnosis may be the same as that explained with reference to the above-described FIG. 9.

The memory controllers 511, 521 and 531 may perform the verification logic operation for non-volatile memories 512_1 to 512_4, 522_1 to 522_4, and 532_1 to 532_4. For example, the first memory controller 511 may write a data pattern in a first area (not shown) of the first non-volatile memory 512_1 and then the read data pattern stored in the first area of the first non-volatile memory 512_1, and may perform a verification logic operation by determining whether the read data pattern is identical to the written data pattern.

While the inventive concept has been particularly shown and described with reference to embodiments thereof, it will be understood that various changes in form and details may be made therein without departing from the spirit and scope of the following claims.

What is claimed is:
1. A storage device configured to be connected to a redundant array of inexpensive disk (RAID) controller, the storage device comprising:
  a plurality of non-volatile memories; and
  a memory controller configured to control the plurality of non-volatile memories to store data distributed by the

RAID controller, based on a RAID configuration signal received from the RAID controller, wherein the memory controller is further configured to perform self-diagnosis on the plurality of non-volatile memories to determine whether at least one of the plurality of non-volatile memories has an uncorrectable error when the RAID configuration signal is deactivated.

2. The storage device of claim 1,
wherein the memory controller is further configured to detect a RAID cancellation request event of the plurality of non-volatile memories, and provide a first RAID deactivation request signal to the RAID controller to deactivate the RAID configuration signal, the first RAID deactivation request signal being provided in response to detecting the RAID cancellation request event.

3. The storage device of claim 2,
wherein the memory controller is further configured to generate a data transfer request signal in response to detecting the RAID cancellation request event, and provide the data transfer request signal to the RAID controller.

4. The storage device of claim 1,
wherein the memory controller is further configured to detect a RAID cancellation request event in response to evaluating an over provisioning (OP) capacity of the plurality of non-volatile memories, wherein OP capacity of a non-volatile memory corresponds to a storage capacity of the non-volatile memory that is not designated for storing user data.

5. The storage device of claim 1,
wherein the memory controller is further configured to determine a number of bad blocks of the plurality of non-volatile memories, and detect a RAID cancellation request event in response to determining that the number of bad blocks is equal to or greater than a threshold level.

6. The storage device of claim 1,
wherein the memory controller is further configured to determine a number of error logs of the plurality of non-volatile memories, and detect a RAID cancellation request event in response to determining that the number of error logs is equal to or greater than a threshold level.

7. The storage device of claim 1,
wherein the RAID controller is further configured to receive a RAID deactivation request signal from a host, and deactivate the RAID configuration signal in response to receiving the RAID deactivation request signal.

8. The storage device of claim 1,
wherein the memory controller is further configured to write a write data pattern in a first area of a first non-volatile memory among the plurality of non-volatile memories and then read a data pattern stored in the first area of the first non-volatile memory, and perform self-diagnosis on the first non-volatile memory that includes determining whether the data pattern read from the first area of the first non-volatile memory is identical to the write data pattern.

9. The storage device of claim 1,
wherein the memory controller is further configured to generate a firmware update request signal and provide the firmware update request signal to a host through the RAID controller, if the RAID configuration signal is deactivated.

10. The storage device of claim 1,
wherein the memory controller is further configured to generate a firmware update request signal and provide the firmware update request signal to a host through the RAID controller, if a result of the self-diagnosis is a failure.

11. The storage device of claim 1,
wherein the memory controller is further configured to generate a RAID activation request signal and provide the RAID activation request signal to the RAID controller, if a result of the self-diagnosis is a success.

12. A storage device comprising:
at least one non-volatile memory including a plurality of memory blocks; and
a memory controller including an internal redundant array of inexpensive disk (RAID) control circuit, the internal RAID control circuit being configured to generate an internal RAID configuration signal,
wherein the memory controller is further configured to control the plurality of memory blocks to allow data to be distributed and stored in the plurality of memory blocks by controlling an internal RAID operation for the plurality of memory blocks, based on the internal RAID configuration signal, and deactivate the internal RAID configuration signal to determine whether at least one of the plurality of memory blocks has an uncorrectable error, and perform self-diagnosis on the plurality of memory blocks.

13. The storage device of claim 12,
wherein the memory controller is further configured to detect a RAID cancellation request event of the plurality of memory blocks, and deactivate the internal RAID configuration signal in response to detecting the RAID cancellation request event.

14. The storage device of claim 12,
wherein the memory controller is further configured to determine the number of program/erase (PE) cycles of the at least one non-volatile memory, and detect a RAID cancellation request event in response to determining the number of PE cycles is equal to or greater than a threshold level.

15. The storage device of claim 12,
wherein the memory controller is further configured to determine a temperature of the at least one non-volatile memory, and detect a RAID cancellation request event if the temperature is equal to or greater than a threshold level.

16. The storage device of claim 12,
wherein the storage device is configured to receive an internal RAID deactivation request signal from a host, and
wherein the memory controller is further configured to deactivate the internal RAID configuration signal in response to receiving the internal RAID deactivation request signal.

17. The storage device of claim 12,
wherein the memory controller is further configured to activate a RAID configuration signal if a result of the self-diagnosis is a success.

18. A storage system comprising:
at least one storage device; and
a data bus connected to the at least one storage device,
wherein the at least one storage device includes:
a memory controller including a peer to peer redundant array of inexpensive disk (P2P RAID) control circuit, the P2P RAID control circuit being configured to generate a P2P RAID configuration signal; and a plurality of non-volatile memories, and wherein the memory controller is configured to control the plurality of non-volatile memories such that provided data is distributed and stored in the plurality of non-volatile memories by controlling a P2P RAID operation for the plurality of non-volatile memories in accordance with the P2P RAID configuration signal, and deactivate the P2P RAID configuration signal to determine whether at least one of the plurality of non-volatile memories has an uncorrectable error, and perform self-diagnosis on the plurality of non-volatile memories.

19. The storage system of claim 18, wherein the memory controller is further configured to detect a RAID cancellation request event of the plurality of non-volatile memories, and deactivate the P2P RAID configuration signal in response to detecting the RAID cancellation request event.

20. The storage system of claim 19, wherein the memory controller is further configured to detect the RAID cancellation request event in response to evaluating an over provisioning (OP) capacity of the plurality of non-volatile memories, wherein OP capacity of a non-volatile memory corresponds to a storage capacity of the non-volatile memory that is not designated for storing user data.

* * * * *